United States Patent [19]

Petruzzelli

[11] Patent Number: 5,522,209
[45] Date of Patent: Jun. 4, 1996

[54] LAWN RAKE AND RAKE HEAD

[76] Inventor: Rocco Petruzzelli, 2 Lady Godiva Way, New City, N.Y. 10956

[21] Appl. No.: 423,973

[22] Filed: Apr. 18, 1995

Related U.S. Application Data

[63] Continuation-in-part of Ser. No. 333,714, Nov. 3, 1994, abandoned, which is a continuation-in-part of Ser. No. 18,738, Feb. 14, 1994, abandoned.

[51] Int. Cl.$^6$ ............................... A01D 7/02; A01D 7/06
[52] U.S. Cl. .................. 56/400.16; 56/400.17; 56/400.21
[58] Field of Search ........................... 56/400, 400.1, 56/400.2, 400.21, 400.16, 400.17, 400.13; 172/378, 379; D8/13

[56] References Cited

U.S. PATENT DOCUMENTS

| | | | |
|---|---|---|---|
| 718,187 | 1/1903 | Baker | 56/400 X |
| 871,339 | 11/1907 | Horn | 56/400.13 X |
| 1,577,065 | 3/1926 | Fuller | 56/400.17 X |

FOREIGN PATENT DOCUMENTS

| | | | |
|---|---|---|---|
| 2078475 | 1/1982 | United Kingdom | 56/400.21 |

*Primary Examiner*—David J. Bagnell
*Attorney, Agent, or Firm*—Furgang & Milde

[57] ABSTRACT

An array of tines are connected to and extend out from a rake head support bar at right angles thereto and are connected thereto in two sets with shank portions of a first set of tines disposed in a first plane and shank portions of a second set of tines disposed in a second plane parallel to said first plane. Action ends of the first set of tines are disposed in a first row which is parallel to and spaced further from said rake head support bar than action ends of the second set of tines which are disposed in a second row. A coil spring is formed from the material of the shank portion of each of the tines so as to unwind if a force is applied to the tine as in effecting a raking action. An alternate embodiment includes a third set of tines similar to the first and second set but with its shank portions in a third plane parallel to the first and second planes and with its tine ends in a third row parallel to the first and second rows. Another alternate forms the tines as substantially "U" shaped members each with a pair of spaced legs each such leg having a shank portion, coil spring and action end and with threaded members connecting a connecting portion of each tine to the rake head. Another embodiment includes wheels carried by the rake head.

78 Claims, 4 Drawing Sheets

LAWN RAKE AND RAKE HEAD

CROSS REFERENCE TO RELATED APPLICATIONS

This application is a continuation-in-part of my earlier filed application Ser. No. 08/333,714 filed Nov. 3, 1994 for Lawn Rake now abandoned; which was a continuation-in-part of my earlier filed application Ser. No. 29/018,738 filed Feb. 14, 1994 for Lawn Rake now abandoned.

BACKGROUND OF THE INVENTION—FIELD OF APPLICATION

This invention relates to garden and farm tools; and more particularly to rakes for thatching and other raking chores and for rake heads for such rakes and for harvester reels.

BACKGROUND OF THE INVENTION—DESCRIPTION OF THE PRIOR ART

Rakes for use in caring for lawns and gardens are available with a considerable number of constructions and configurations for the head of the rake and the tines carried thereby. For example: U.S. Pat. No. 1,394,353 patented on Oct. 18, 1921 to P. Reinwald for "Rake" shows and describes a rake with a single row of tines; while U.S. Pat. No. 1,980,252 patented on Nov. 13, 1934 to W. H. Bergmann for "Rake" and U.S. Pat. No. 4,606,180 patented on Aug. 19, 1986 to G. R. Archer for "Gardening Tool" show similar single row tine rakes but with sinuous waves also so as to facilitate resilient action of the tines upon the surface and the material being raked. However, the material to be raked may slip under or otherwise avoid the tines of a rake with only a single row of tines and constructing the tines or their shanks in a sinuous configuration may not provide the required flexibility or raking action and thus render such rake constructions unacceptable.

Other rake constructions, such as those shown and described in U.S. Pat. No. 1,577,065 patented on Mar. 16, 1926 to H. E. Fuller for "Lawn Broom", in U.S. Pat. No. 2,095,693 patented on Oct. 12, 1937 to H. E. Fuller for "Rake" and in U.S. Pat. No. 4,409,781 patented on Oct. 18, 1983 to G. H. Blackstone for "Thatching Tool For Rotary Lawn Mower" incorporate a coil within the wire that forms the rake tine but do so so that the coil surrounds a part of the rake head thus limiting the spring action of the coil with respect to the rakes tines and creating a relatively difficult construction for the rake head construction and for tine replacement.

Still other rake head and rake head like constructions, such as shown and described in U.S. Pat. No. 319,631 patented on Jun. 9, 1885 to N. Sellers for "Hand Rake" and in U.S. Pat. No. 4,630,432 patented on Dec. 23, 1986 to J. E. Love et al for "Pick-Up Tine Assembly For Harvester Reels" place a coil formed as part of a tine in a notch formed in the rake head for rakes or bat for harvester reels. Such constructions render assembly of an otherwise relatively simple tool relatively expensive and costly and make tine replacement also a relatively difficult chore.

U.S. Pat. No. 951,024 patented on Mar. 1, 1910 to J. N. Parker for "Rake" and U.S. Pat. No. 2,608,045 patented on Aug. 26, 1952 to R. W. Keene for "Quick Detachable Pickup Finger For Harvester Reels" and U.S. Pat. No. 3,026,667 patented on Mar. 27, 1962 to J. L. Morrison et al for "Rake Tooth Assembly" and U.S. Pat. No. 3,394,537 patented on Jul. 30, 1968 to R. W. Keene for "Snap-Lock Quick-Detachable Pick-up Finger Unit for Harvester Reels" all show and describes tines of fingers which incorporate spring action coils. These constructions, however, utilize the spring action of the coil to facilitate disposition of the tines or fingers onto the carrying head and thus require a more complex coil construction which may not facilitate an efficient coaction of tines with the surface and material to be worked on.

The action of the spring coils in construction such as those shown and described: in U.S. Pat. No. 202,173 patented on Apr. 9, 1878 to W. B. Jackson for "Horse Hay Rake"; in U.S. Pat. No. 1,147,741 patented on Jul. 27, 1915 to J. MacPhail for "Rake Tooth"; and in U.S. Pat. No. 3,045,414 patented on Jul. 24, 1962 to E. L. Scheidenhelm for "Reel Finger" is such as to close and further wind the spring coil. Such action may render the rake action too inflexible and difficult and may be unacceptable.

U.S. Pat. No. 23,660 patented on Sep. 25, 1894 to L. Gibbs for "Lawn Rake" shows a rake head with two rows of tines or prongs but which are to be used independently of each other; while U.S. Pat. No. 2,329,708 patented on Sep. 21, 1943 to O. B. Fetterman for "Push Rake" shows and describes a set of tines with their respective tine ends extending two different distances from the rake head but with their respective tine shanks in a single plane which may thus limit the action of the tines upon the surface and material to be raked. U.S. Pat. No. 5,099,638 patented on Mar. 31, 1992 to M. C. Bass for "Tri-Blade Yard Rake" on the other hand, shows and describes a relatively complex and crowded rake head construction with three rows of tine ends.

SUMMARY OF THE INVENTION

It is therefore an object of this invention to provide a new and novel rake.

It is another object of this invention to provide a new and novel thatching rake.

It is yet another object of this invention to provide new and novel rake heads for lawn rakes and harvester reels.

It is yet another object of this invention to provide new and novel lawn rakes with tines that have shank portions disposed in plural planes and shank end portions disposed in plural rows.

It is yet still a further object of this invention to provide a new and novel rake constructions with tine shanks in plural parallel planes and tine ends in plural parallel rows; and with as many rows as planes.

It is still another object of this invention to provide new and novel rake constructions each with tines that each include a spring coil disposed to open in response to coaction of the rake tine with the surface and material to be raked.

It is yet still another object of this invention to provide new and novel rake heads or bat head tine mounting construction and configurations.

Other objects, features and advantages of the invention in its details of construction and arrangement of parts will be seen from the above and from the following description of the preferred embodiment when considered with the drawing and from the appended claims.

DESCRIPTION OF THE PREFERRED EMBODIMENTS

With reference to the FIGS. 1–8, there is generally shown at 10 a lawn rake of the type that could be: utilized to rake debris and other materials off of a lawn surface; and/or utilized for lawn thatching or for other gardening chores. The construction of a support piece or rake head 12 of rake 10 not only facilitates the use of lawn rake 10 for the aforementioned lawn and gardening chores but may also find use for other farm related work such as a bat head for harvesting reels.

Rake head 12 includes a support bar 14 of substantially "L" shaped cross-sectional configuration having a first leg 16 and a second leg 18. A handle 20 (FIGS. 1 and 3–7) is provided for rake head 12 and lawn rake 10 and is connected at an end 22 to rake head 12 by suitable means such as by external threads 24 (FIG. 7) formed at end 22 of handle 20 that mate with internal threads 26 formed within a handle socket 28 carried by rake head 12. Socket 28 is secured in place on support bar 14 by suitable means such as by welding or the like at 19 (FIG. 7) and may be further secured in place to leg 16 of support 14 as by the use of threaded members or rivets 30 (FIGS. 1–6). A pair of support arms 40, each having a first end secured to leg 16 of support bar 14 of rake head 12 as by threaded members or rivets 42, are connected at their respective second ends to a handle receiver 44 as by threaded members or rivets 46. Handle receiver 44 provides a snug opening through which handle 20 of lawn rake 10 extends. Appropriate tightening of securing members 46 effect a tight grip between handle receiver 44 and handle 20 and along with the connection of external threads 24 of handle 20 and internal threads 26 of handle socket 28 serve to secure handle 20 to rake head or support 12. Other suitable and appropriate means may be employed to attach handle 20 to rake head 12 releasably or permanently and to connect socket 28 and support arms 40 to support bar 14 of rake head 12.

An array 60 (FIGS. 1, 2 and 4–6) of tines 62, 64 are carried by leg 16 of support bar 14 of rake head 12. Each tine 62, 64 is carried by leg 16 of support bar 14 of rake head 12. Each tine 62, 64 includes a connecting end 66 (FIGS. 1, 3, 6 and 7) suitable and conventionally secured to leg 16 as by welding or the like. Each tine 62, 64 also includes a shank portion 68, 70 (FIGS. 1 and 7) respectively extending from their connecting ends 66 and into a downward bend 72, 74 (FIG. 7) to form an action end 82, 84 for each of the tines 62, 64 respectively. Each tine 62, 64 also includes a spring coil 86, 88 disposed beneath shank portions 68, 70 respectively and wound so that forces applied to action ends 82, 84 either downwardly in the direction of arrow "X" (FIG. 7) or against the tines in the direction of arrow "Z", as when used in a raking procedure, will tend to unwind coils 86, 88. The spring action of the material from which tines 62, 64 are fabricated and the formation of coils 86, 88, upon relaxation of the aforementioned forces as when rake head 12 and tines 62, 64 are removed from a raking procedure, will return spring coils 86, 88 and tines 62, 64 to their configuration shown in the figures.

While tines 62, 64 have been described as fabricated from spring steel wire it should be understood that other steel configurations and other materials can be utilized as long as the required resilient spring action results.

It should be noted that shank portions 68 of tines 62 all lie in a common plane P-1 (FIG. 1) and that shank portions 70 of tines 64 also all lie in a common plane P-2, and that planes P-1 and P-2 are parallel to each other. Similarly, action ends 82 of tines 62 all form a row R-1 (FIG. 1) while action ends 84 of tines 64 all form a row R-2 and that rows R-1 and R-2 are parallel to each other. Spring coils 86 of tines 62 are fabricated to all align about an axis C-1 while spring coils 88 of tines 64 are fabricated to all align about an axis C-2.

Rake 10, when utilized in a raking procedure such as removing leaves, grass or other debris from a lawn, or such as thatching, is drawn in the direction of arrow S (FIG. 7) and so that the tips of action ends 82, 84 of tines 62, 64 coact with the lawn debris or the ground surface 90, or both. The resilience of tines 62, 64 and of spring coils 86, 88 provide a predetermined flexibility for the raking action and the disposition of spring ends 82, 84 in two rows (R-1 and R-2) enables lawn debris missed by tines 62 in row R-1 to be acted on by tines 64 in row R-2. The disposition of shank portions 68, 70 of tines 62, 64 in two rows provides a more accessible spacing for securing the respective connecting ends 66 of tines 62, 64 to leg 18 of rake head 12.

Figure 1:
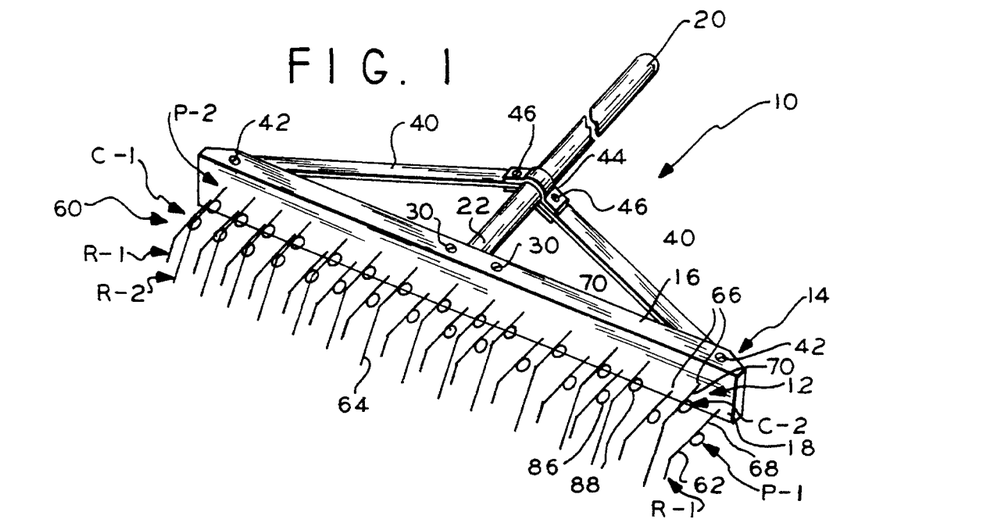
FIG. 1 is a perspective view of a lawn rake incorporating the instant invention.
Figure 2:
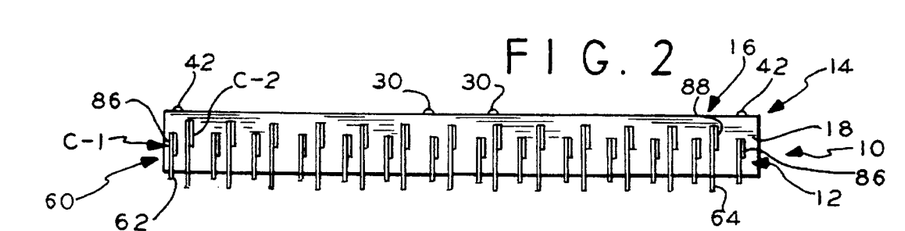
FIG. 2 is a front elevation view of the lawn rake of FIG. 1.
Figure 3:
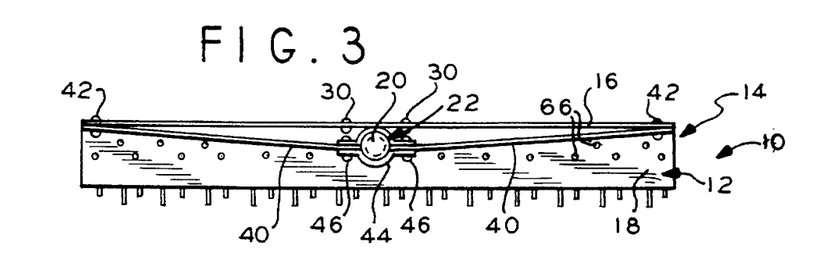
FIG. 3 is a back elevation view of the lawn rake of FIGS. 1 and 2.
Figure 4:
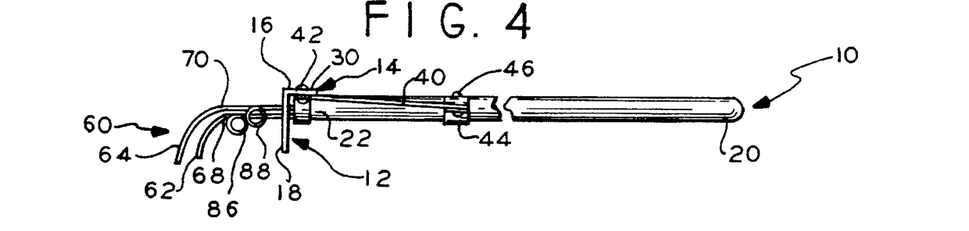
FIG. 4 is a side elevation view of the lawn rake of FIGS. 1–3.
Figures 5, 6, 7, 8:
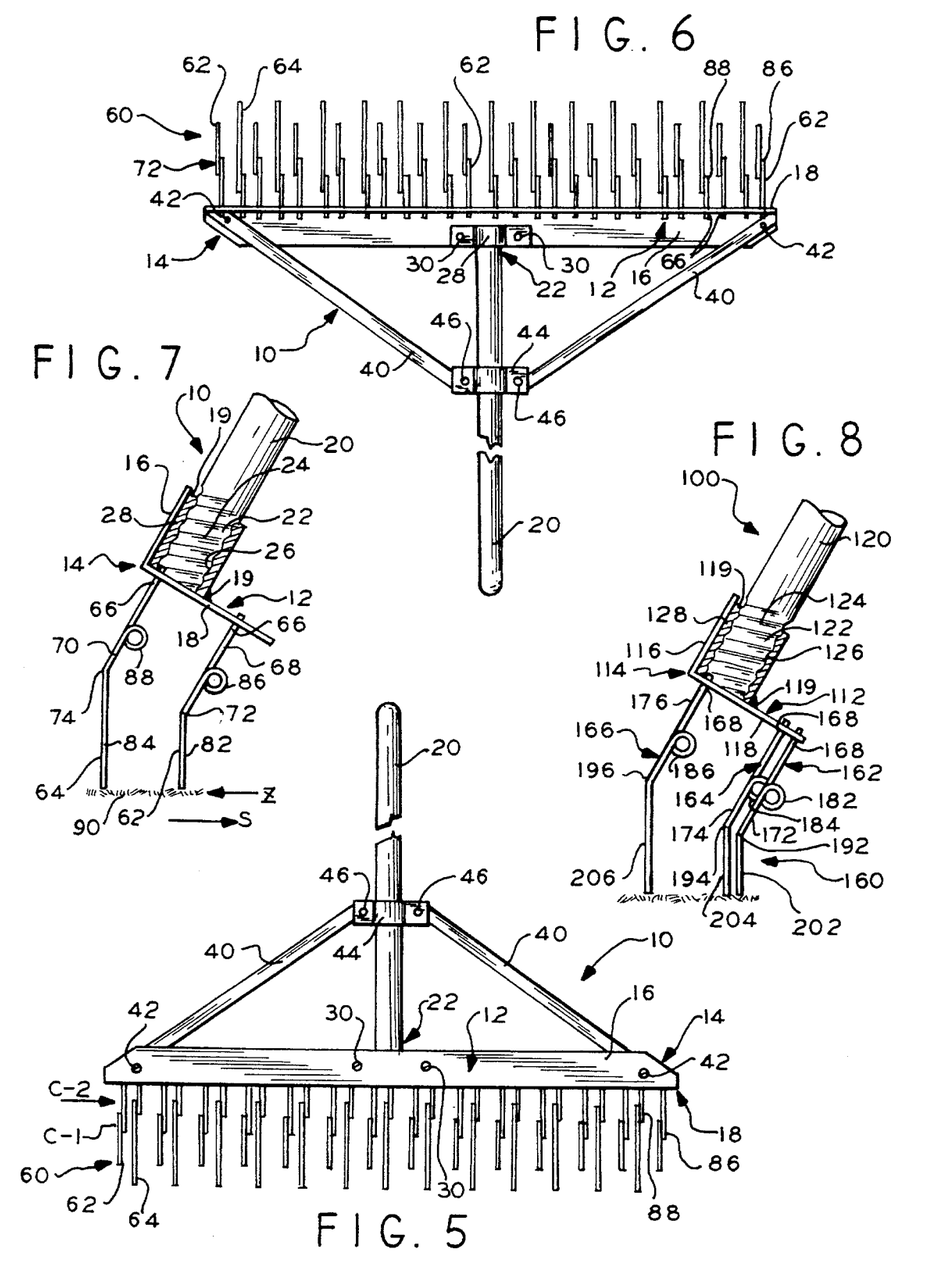
FIG. 5 is a top plan view of the lawn rake of FIGS. 1–4.
FIG. 6 is a bottom plan view of the lawn rake of FIGS. 1–5.
FIG. 7 is partial side elevation view in partial section, of the head end of the lawn rake of FIGS. 1–6 enlarged to better show details thereof.
FIG. 8 is a partial side elevation view, in partial section, similar to FIG. 7 but showing an alternate embodiment of head and tine arrangement also incorporating the instant invention.

FIG. 8 shows an alternative embodiment of rake head 112 for a rake 100. A support 114 for rake head 112 includes a first leg 116 and a second leg 118 to which a socket 126 is secured as welding at 119 or the like. A rake handle 120, similar to rake handle 20 of the embodiment of FIGS. 1–7, has an end 122 externally threaded at 124 and to be received within internal threads 126 of a socket 128.

Rake head 112 is provided with an array 160 of tines 162, 164, 166 each connected at a connecting end 168 to leg 118 of support bar 114 of rake head 112. Each tine 162, 164, 166 includes a shank portion 172, 174, 176, a spring coil 182, 184, 186 a bend 192, 194, 196 and an action end 202, 204, 206 respectively all similar to the connecting ends, shank portions, spring coils, bends and action ends of tines 62, 64 of the embodiment of FIGS. 1-7 except that there are three sets of tines. The respective shank portions 172, 174, 176 of tines 162, 164, 166 occupy parallel and spaced planes; while the action ends 202, 204, 206 occupy and defines spaced and parallel rows; all similar to tines 62, 64 of the FIGS. 1–7 embodiment. The respective spring coils 182, 184, 186 are aligned about respective spaced axis.

Rake 100 is utilized in manners similar to rake 10 but applies three rows of tine ends to the surface or material being raked.

Figures 9, 10:
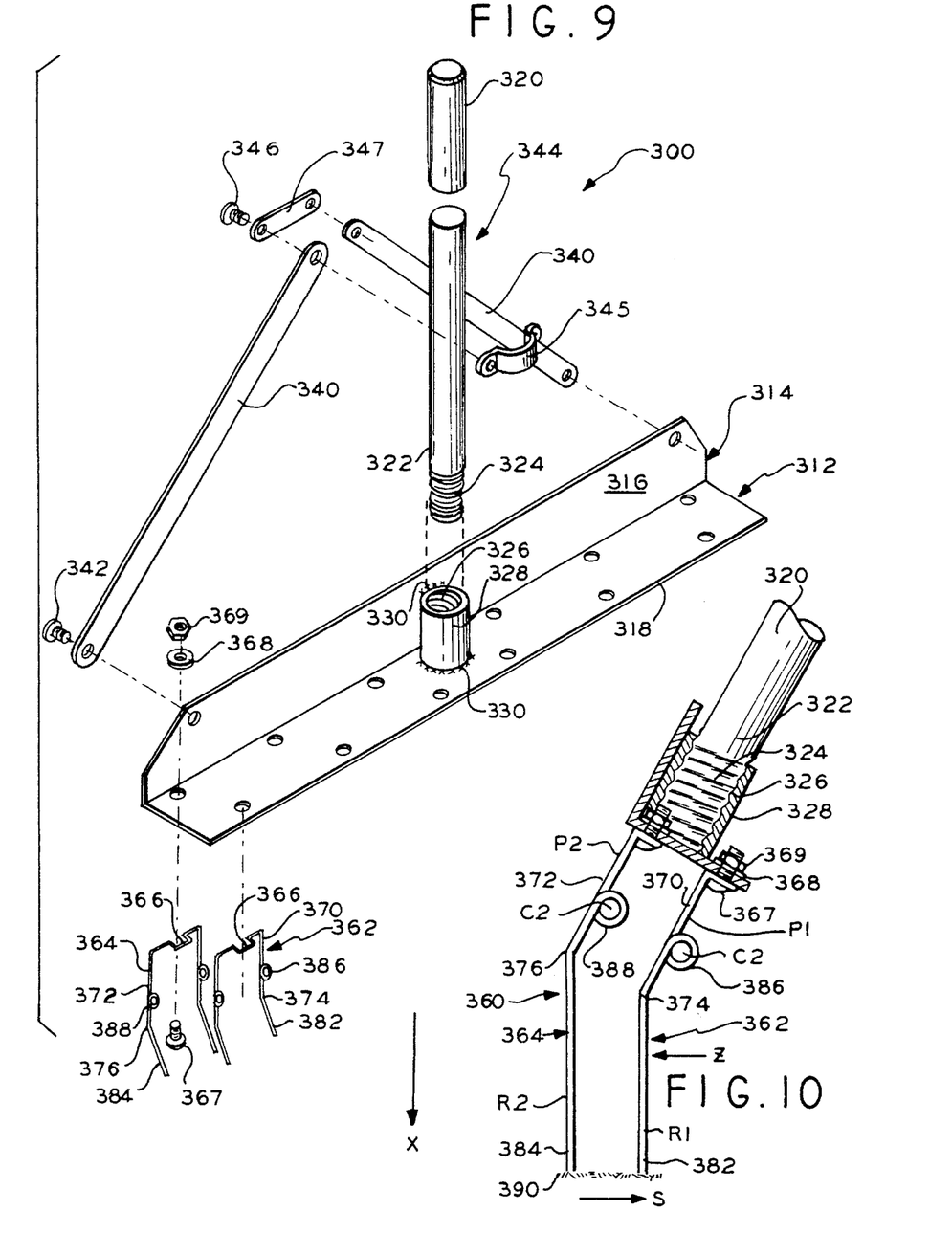
FIG. 9 is an exploded perspective view of an alternate embodiment of rake and rake head incorporating the instant invention.
FIG. 10 is a partial side elevation view of the rake of FIG. 9 enlarged to better show details of the rake head thereof.

FIGS. 9 and 10 show another alternative embodiment of rake and rake head 300 utilized to rake debris and other material off a lawn surface; and/or utilized for lawn thatching or for other gardening chores. The construction of a support piece of rake head 312 of rake 300 not only facilitates the use of rake 300 for the aforementioned lawn and gardening chores but may also find use for other farm related work such as a bat head for harvesting reels.

Rake head 312 includes a support bar 314 of substantially "L" shaped cross-sectional configuration having a first leg 316 and a second leg 318. A handle 320 is provided for rake head 312 and lawn rake 300 and is connected at an end 322 to rake head 312 by suitable means such as by external threads 324 formed at end 322 of handle 320 that mate with internal threads 326 formed within a handle socket 328 carried by rake head 312. Socket 328 is secured in place to support bar 314 by suitable means such as by welding or the like at 330. A pair of support arms 340 (FIG. 9) each having a first end secured to leg 316 of support bar 314 of rake head 312 as by threaded members or rivets 342, are connected at their respective second ends to a handle receiver 344 as by threaded members or rivets 346. Handle receiver 344 includes a pair of members 345, 347 and provides a snug opening through which handle 320 of rake 300 extends. Appropriate tightening of securing members 346 effect a tight grip between handle receiver 344 and handle 320 and along with the connection of external threads 324 of handle 320 and internal threads 326 of handle socket 328 serve to secure handle 320 to rake head or support 312. Other suitable and appropriate means may be employed to attach handle 320 to rake head 312 releasably or permanently and to connect socket 328 and support arms 340 to support bar 314 or rake head 312.

An array 360 (FIGS. 9 and 10) of tines 362, 364 are carried by leg 316 of support bar 314 of rake head 312. Each tine 362, 364 is carried by leg 318 of support bar 314 of rake head 312. Each tine 362, 364 includes a connecting end 366 secured to leg 318 by threaded members such as bolts, nuts and washers 367, 368, 369 respectively or the like. Each tine 362, 364 is formed substantially as a "U" and also includes a pair of shank portions 370, 372 respectively extending from their connecting ends 366 and into a pair of downward bends 374, 376 to form a pair of action ends 382, 384 for each of the tines 362, 364 respectively. Each tine 362, 364 also includes a pair of spring coils 386, 388 disposed beneath shank portions 370, 372 respectively and wound so that forces applied to action ends 382, 384 either downwardly in the direction of arrow "X" or against the tines in the direction of arrow "Z", as when used in a raking procedure, will tend to unwind coils 386, 388. The spring action of the material from which tines 362, 364 are fabricated and the formation of coils 386, 388 upon relaxation of the aforementioned forces as when rake head 312 and tines 362, 364 are removed from a raking procedure, will return spring coils 386, 388 and tines 362, 364 to their configuration shown in the figures.

While tines 362, 364 have been described as fabricated from spring steel wire it should be understood that other steel configurations and other materials can be utilized as long as the required resilient spring action results.

It should be noted that shank portions 370 of tines 362 all lie in a common plane P-1 (FIG. 10) and that shank portions 372 of tines 364 also all lie in a common plane P-2, and that planes P-1 and P-2 are parallel to each other. Similarly, action ends 382 of tines 362 all form a row R-1 (FIG. 10) while action ends 384 of tines 364 all form a row R-2 and that rows R-1 and R-2 are parallel to each other. Spring coils 386 of tines 362 are fabricated to all align about an axis C-1 while spring coils 388 of tines 364 are fabricated to all align about an axis C-2.

Rake 300, when utilized in a raking procedure such as removing leaves, grass or other debris from a lawn, or such as thatching, is drawn in the direction of arrow S (FIG. 10) and so that the tips of action ends 382, 384 coact with the lawn debris or the ground surface 390, or both. The resilience of tines 362, 364 and of spring coils 386, 388 provide a predetermined flexibility for the raking action and the disposition of spring ends 382, 384 in two rows (R-1 and R-2) enables lawn debris missed by tines 362 in row R-1 to be acted on by tines 364 in row R-2. The disposition of shank portions 370, 372 of tines 362, 364 in two rows provides a more accessible spacing for securing the respective connecting ends 366 of tines 362, 364 to leg 318 of rake head 312.

Figure 11:
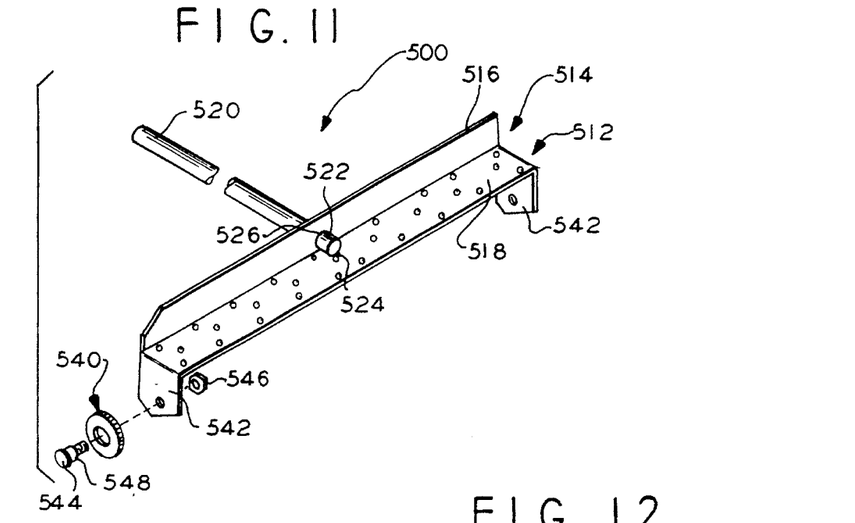
FIG. 11 is a perspective view of another alternate embodiment of rake and rake head incorporating the instant invention partially exploded and with tines removed to better show details thereof.
Figure 12:
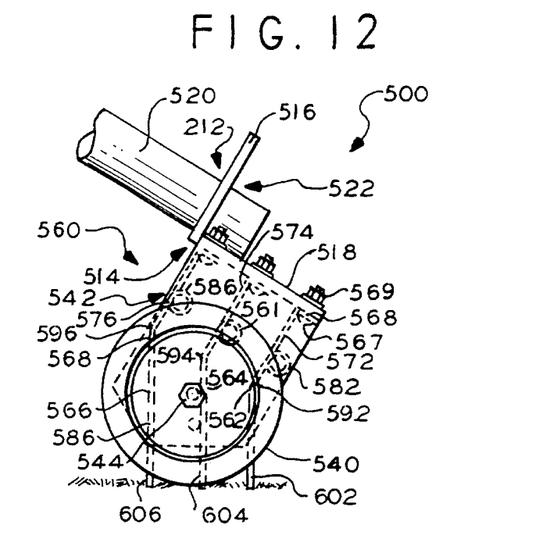
FIG. 12 is a side elevation view of the rake head portion of the rake of FIG. 11 enlarged to better show details thereof.

FIGS. 11 and 12 show yet another alternative embodiment of rake and rake head 500 utilized to rake debris and other material off a lawn surface; and/or utilized for lawn thatching or for other gardening chores. The construction of a support piece or rake head 512 of rake 500 not only facilitates the use of rake 500 for the aforementioned lawn and gardening chores but may also find use for other farm related work such as a bat head for harvesting reels.

Rake head 512 includes a support bar 514 of substantially "L" shaped cross-sectional configuration having a first leg 516 and a second leg 518. A handle 520 is provided for rake head 512 and lawn rake 500 and is connected at an end 522 to rake head 512 by suitable means such as by welding at 524 to leg 518 and at 526 to leg 516. A hole (not shown) is formed through leg 516 to receive end 522 of handle 520. Other suitable and appropriate means may be employed to attach handle 520 to rake head 512 such as support arms similar to support arms 40 of FIG. 1, 3, 4, 5 and 6 or support arms 340 of FIG. 9.

Rake head 512 is supported by a pair of wheels 540 (only one shown) each rotatively supported on an end piece 542 of support bar 514 of rake head 512. A threaded member 544 and nut 546 (FIG. 11) retain wheels 540 in position on their respective end pieces 542. Each threaded member 544 includes a bearing shaft portion 548 to facilitate rotation of wheels 540.

Rake head 512 is provided with an array 560 of tines 562, 564, 566 each connected at a connecting end 568 to leg 518 of support bar 514 of rake head 512. Each tine 562, 564, 566 includes a shank portion 572, 574, 576, a spring coil 582, 584, 586 a bend 592, 594, 596 and an action end 602, 604, 606 respectively all similar to the connecting ends, shank portions, spring coils, bends and action ends of tines 62, 64 of the embodiment of FIGS. 1–7 or 362, 364 of the embodiment of FIGS. 9 and 10, except that there are three sets of tines. The respective shank portions 572, 574, 576 of tines 562, 564, 566 occupy parallel and spaced planes; while the action ends 602, 604, 606 occupy and define spaced and parallel rows; all similar to tines 62, 64 of the FIGS. 1–7 embodiment and tines 362, 364 of FIGS. 9 and 10 embodiment. The respective spring coil 582, 584, 586 are aligned about respective spaced axis.

Rake 500 is utilized in manners similar to rakes 10 and 300 but applies three rows of tine ends to the surface or material being raked.

Figure 13:
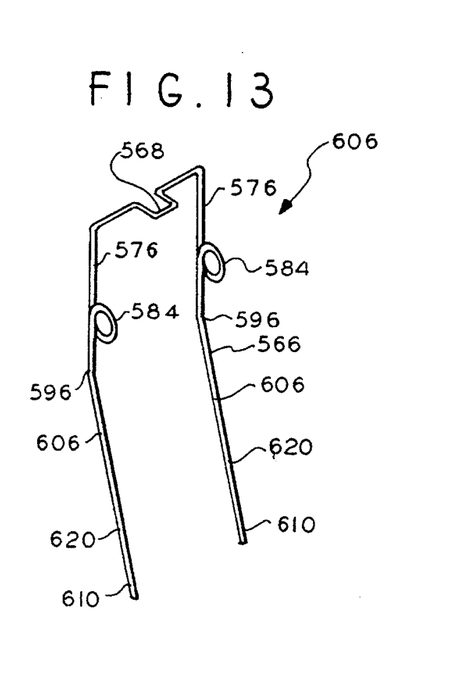
FIG. 13 is a perspective view of a tine usable with the rake heads of the FIGS. 9 an 10 embodiment and FIGS. 11 and 12 embodiment.

FIG. 13 shows an enlarged perspective view of a tine 566 with its respective connecting end 568 and pair of shank portions 576, pair of coils 584, pair of downward bends 596 and pair of action ends 606. Tines 566 are fabricated from suitable wire stock and into the depicted substantially "U" shaped configuration and as the tines with the longest action ends.

Tines 564 may be formed from tines 566 by having end portion 610 severed from action ends 606 to form shorter action ends 604; while tines 562 may be formed from tines 566 by having end portions 610 and other end portions 620 severed from action ends 606 to form action ends 602. Tines 562, 564 may be otherwise fabricated to the desired length.

From the above description it will thus be seen that there has been provided new and novel lawn rakes which are relatively simple and reliable in construction and operation.

It is understood that although I have shown the preferred embodiments of my invention that various modifications may be made in details thereof without departing from the spirit as comprehended by the following claims.

What is claimed is:

1. A lawn rake; comprising:
   (a) rake head means serving as a support;
   (b) rake handle means connected to said rake head means for moving said rake head means in predetermined manners to effect a raking action;
   (c) an array of tine means carried by said rake head means for coaction with a surface and or material disposed upon the surface when the lawn rake is effecting a raking action;
   (d) each of said tine means of said array of tine means including a shank portion having an end connected to said rake head means so as to extend outwardly therefrom and an action portion extending from and disposed at a predetermined angle with respect to its respective said shank portion;
   (e) each of said tine means of said array of tine means further including a spring coil formed so that at least a portion of said coil unwinds upon utilization of the rake; and
   (f) said array of tine means including at least two sets of tine means, a first set of which having its respective said shank portions in a first plane and its respective said action ends defining a first row of tine ends, a second set of which having its respective said shank portions in a second plane and its respective said action ends defining a second row of tine ends.

2. The lawn rake of claim 1, wherein each said spring coil is integrally formed from the material of the respective said tine means.

3. The lawn rake of claim 2, wherein said first plane and said second plane are parallel and spaced one from the other and said first row and said second row are parallel and spaced one from the other.

4. The lawn rake of claim 2, wherein said spring coils of said respective first set of tine means are aligned about a first axis and said spring coils of said respective second set of tine means are aligned about a second axis.

5. The lawn rake of claim 4, wherein said first axis is radially spaced from said second axis.

6. The lawn rake of claim 2, wherein said tine means are formed from material which is resilient and springy.

7. The lawn rake of claim 1, wherein each tine means is substantially "U" shaped in configuration and includes a pair of spaced legs each said leg having a shank portion, a spring coil and an action portion, said shank portions being connected by a connecting portion for connecting said tine means to said rake head means.

8. The lawn rake of claim 7, wherein threaded members connect each said tine means to said rake head means through said connecting portion.

9. The lawn rake of claim 1 including wheel means carried at each end of said rake head means to facilitate movement of the lawn rake over a surface.

10. A lawn rake; comprising:
    (a) rake head means serving as a support;
    (b) rake handle means connected to said rake head means for moving said rake head means in predetermined manners to effect a raking action;
    (c) an array of tine means carried by said rake head means for coaction with a surface and or material disposed upon the surface when the lawn rake is effecting a raking action;
    (d) each of said tine means of said array of tine means including a shank portion having an end connected to said rake head means so as to extend outwardly therefrom and an action portion extending from and disposed at a predetermined angle with respect to its respective said shank portion;
    (e) each said shank portion of said tine means of said array of tine means further including a spring coil disposed at a location spaced from said shank portion end that is connected to said rake head means; and
    (f) said array of tine means including at least two sets of tine means a first set of which having its respective said shank portions in a first plane and its respective said action ends defining a first row of tine ends, a second set of which having its respective said shank portions in a second plane and its respective said action ends defining a second row of tine ends.

11. The lawn rake of claim 10, wherein said first plane and said second plane are parallel and spaced one from the other and said first row and said second row are parallel and spaced one from the other.

12. The lawn rake of claim 11, wherein said spring coils of said respective first set of tine means are aligned about a first axis and said spring coils of said respective second set of tine means are aligned about a second axis.

13. The lawn rake of claim 12, wherein said first axis is radially spaced from said second axis.

14. The lawn rake of claim 11, wherein said array of tine means includes a third set of tine means each having its respective said shank portions in a third plane parallel to and spaced from said first plane and said second plane and having its respective said action ends defining a third row of tine ends parallel to and spaced from said first row and said second row.

15. The lawn rake of claim 14, wherein said spring coils of said respective first set of tine means are aligned about a first axis, said spring coils of said respective second set of tine means are aligned about a second axis, and said spring coils of said respective third set of tine means are aligned about a third axis.

16. The lawn rake of claim 15, wherein said first axis, said second axis and said third axis are radially spaced from each other.

17. The lawn rake of claim 16, wherein said tine means are formed from material which is resilient and springy.

18. The lawn rake of claim 17, wherein said spring coil of each of said tine means are fabricated so as to unwind at least a portion of the coil upon utilization of the rake in effecting a raking action.

19. The lawn rake of claim 18, wherein said rake head includes a support bar and said shank portions of said tine means each include a connecting end each secured to said support bar at right angle thereto.

20. The lawn rake of claim 10, wherein said tine means are formed from material which is resilient and springy.

21. The lawn rake of claim 20, wherein said spring coil of each of said tine means are fabricated so as to unwind at least a portion of the coil upon utilization of the rake in effecting a raking action.

22. The lawn rake of claim 20, wherein said rake head includes a support bar and said shank portions of said tine means each include a connecting end each secured to said support bar at right angle thereto.

23. The lawn rake of claim 10, wherein said spring coils are integrally formed from the material of the respective said tine means.

24. A lawn rake; comprising:
(a) rake head means serving as a support and including a support bar;
(b) rake handle means; connected to said rake head means for moving said rake head means in predetermined manners to effect a raking action;
(c) an array of tine means carried by said rake head means for coaction with a surface and or material disposed upon the surface when the lawn rake is effecting a raking action;
(d) each of said tine means of said array of tine means including a shank portion having a connecting end secured to said support bar of said rake head means, at a right angle to said support bar, and so as to extend outwardly therefrom and an action portion extending from and disposed at a predetermined angle with respect to its respective said shank portion;
(e) each of said tine means of said array of tine means further including a spring coil integrally formed from the material of the respective said tine means; and
(f) said array of tine means including at least two sets of tine means, a first set of which having its respective said shank portions in a first plane and its respective said action ends defining a first row of tine ends, a second set of which having its respective said shank portions in a second plane and its respective said action ends defining a second row of tine ends.

25. A lawn rake; comprising:
(a) rake head means serving as a support;
(b) rake handle means connected to said rake head means for moving said rake head means in predetermined manners to effect a raking action;
(c) an array of tine means carried by said rake head means for coaction with a surface and or material disposed upon the surface when the lawn rake is effecting a raking action;
(d) each of said tine means of said array of tine means including a shank portion having an end connected to said rake head means so as to extend outwardly therefrom and an action portion extending from and disposed at a predetermined angle with respect to its respective said shank portion;
(e) each of said tine means of said array of tine means further including a spring coil integrally formed from the material of the respective said tine means;
(f) said array of tine means including at least three sets of tine means, a first set of tine means having its respective said shank portions in a first plane and its respective said action ends defining a first row of tine ends, a second set of tine means having its respective said shank portions in a second plane parallel to said first plane and its respective said action ends defining a second row of tine ends parallel to said first row of tine ends, and a third set of tine means having its respective said shank portions in a third plane parallel to said first plane and said second plane and its respective said action ends defining a third row of tine ends parallel to said first row and said second row of tine ends;
(g) said first plane, second plane and third plane being spaced one from the other; and
(h) said first row, second row and third row being spaced one from the other.

26. The lawn rake of claim 25, wherein said spring coils of said respective first set of tine means are aligned about a first axis, said spring coils of said respective second set of tine means are aligned about a second axis, and said spring coils of said respective third set of tine means are aligned about a third axis.

27. The lawn rake of claim 26, wherein said first axis, said second axis and said third axis are radially spaced from each other.

28. The lawn rake of claim 27, wherein said tine means are formed from material which is resilient and springy.

29. The lawn rake of claim 28, wherein said spring coil of each of said tine means are fabricated so as to unwind at least a portion of the coil upon utilization of the rake in effecting a raking action.

30. The lawn rake of claim 29, wherein said rake head includes a support bar and said shank portions of said tine means each include a connecting end each secured to said support bar at right angle thereto.

31. The lawn rake of claim 25, wherein each tine means is substantially "U" shaped in configuration and includes a pair of spaced legs each said leg having a shank portion, a spring coil and an action portion, said shank portions being connected by a connecting portion for connecting said tine means to said rake head means.

32. The lawn rake of claim 31, wherein threaded members connect each said tine means to said rake head means through said connecting portion.

33. The lawn rake of claim 25 including wheel means carried at each end of said rake head means to facilitate movement of the lawn rake over a surface.

34. A lawn rake; comprising:
(a) a rake head;
(b) a rake handle connected to said rake head;
(c) an array of tines carried by said rake head;
(d) each of said tines of said array of tines including a shank portion having an end connected to said rake head so as to extend outwardly therefrom and an action portion extending from and disposed at a predetermined angle with respect to its respective said shank portion;
(e) each of said tines of said array of tines further including a spring coil formed and fabricated so as to unwind at least a portion of the coil upon utilization of the rake; and (f) said array of tines including at least two sets of tines, a first set of which having its respective said shank portions in a first plane and its respective said action ends defining a first row of tine ends, a second set of which having its respective said shank portions in a second plane and its respective said action ends defining a second row of tine ends.

35. The lawn rake of claim 34, wherein said first plane and said second plane are parallel and spaced one from the other and said first row and said second row are parallel and spaced one from the other.

36. The lawn rake of claim 35, wherein said spring coils of said respective first set of tines are aligned about a first axis and said spring coils of said respective second set of tines are aligned about a second axis.

37. The lawn rake of claim 36, wherein said first axis is radially spaced from said second axis.

38. The lawn rake of claim 37, wherein said tines are each formed from material which is resilient and springy.

39. The lawn rake of claim 34, wherein each tine means is substantially "U" shaped in configuration and includes a pair of spaced legs each said leg having a shank portion, a spring coil and an action portion, said shank portions being connected by a connecting portion for connecting said tine means to said rake head means.

40. The lawn rake of claim 39, wherein threaded members connect each said tine means to said rake head means through said connecting portion.

41. The lawn rake of claim 34 including a pair of wheels on wheel disposed at each respective end of said rake head.

42. The lawn rake or claim 34, wherein each said spring coil is integrally formed from the material of the respective said tine.

43. A lawn rake; comprising:

(a) a rake head;

(b) a rake handle connected to said rake head;

(c) an array of tines carried by said rake head;

(d) each of said tines of said array of tines including a shank portion having an end connected to said rake head so as to extend outwardly therefrom and an action portion extending from and disposed at a predetermined angle with respect to its respective said shank portion;

(e) each said shank portion of said tines of said array of tines further including a spring coil disposed at a location spaced from said shank portion end that is connected to said rake head; and (f) said array of tines including at least two sets of tines, a first set of which having its respective said shank portions in a first plane and its respective said action ends defining a first row of tine ends, a second set of which having its respective said shank portions in a second plane and its respective said action ends defining a second row of tine ends.

44. The lawn rake of claim 43, wherein said first plane and said second plane are parallel and spaced one from the other and said first row and said second row are parallel and spaced one from the other.

45. The lawn rake of claim 44, wherein said spring coils of said respective first set of tines are aligned about a first axis and said spring coils of said respective second set of tines are aligned about a second axis.

46. The lawn rake of claim 45, wherein said first axis is radially spaced from said second axis.

47. The lawn rake of claim 46, wherein said tines are each formed from material which is resilient and springy.

48. The lawn rake of claim 47, wherein said spring coils are integrally formed from the material of the respective tines.

49. The lawn rake of claim 48, wherein said spring coil of each of said tines are fabricated so as to unwind at least a portion of the coil upon utilization of the rake in effecting a raking action.

50. The lawn rake of claim 49, wherein said rake head includes a support bar and said shank portions of said tines each include a connecting end each secured to said support bar at right angle thereto.

51. The lawn rake of claim 50, wherein said array of tines includes a third set of tines having its respective said shank portions in a third plane parallel to and spaced from said first plane and said second plane and having its respective said action ends defining a third row of tine ends parallel to and spaced from said first row and said second row.

52. The lawn rake of claim 51, wherein said spring coils of said third set of tines are aligned about a third axis.

53. The lawn rake of claim 52, wherein said first axis, said second axis and said third axis are radially spaced from each other.

54. A lawn rake; comprising:

(a) a rake head including a support bar;

(b) a rake handle connected to said rake head;

(c) an array of tines carried by said rake head;

(d) each of said tines of said array of tines including a shank portion including a connecting end secured to said support bar of said rake head at a right angle to said support bar and so as to extend outwardly therefrom and an action portion extending from and disposed at a predetermined angle with respect to its respective said shank portion;

(e) each of said tines of said array of tines further including a spring coil integrally formed from the material of the respective said tine; and (f) said array of tines including at least two sets of tines, a first set of which having its respective said shank portions in a first plane and its respective said action ends defining a first row of tine ends, a second set of which having its respective said shank portions in a second plane and its respective said action ends defining a second row of tine ends.

55. A lawn rake; comprising:

(a) a rake head including a support bar;

(b) a rake handle connected to said rake head;

(c) an array of tines each formed from material which is resilient and springy and carried by said rake head;

(d) each of said tines of said array of tines including a shank portion including a connecting end secured to said support bar of said rake head at a right angle to said support bar and so as to extend outwardly therefrom and an action portion extending from and disposed at a predetermined angle with respect to its respective said shank portion;

(e) each of said tines of said array of tines further including a spring coil formed and fabricated so as to unwind at least a portion of the coil upon utilization of the rake; and (f) said array of tines including at least three sets of tines, a first set of said tines having its respective said shank portions in a first plane and its respective said action ends defining a first row of tine ends, a second set of said tines having its respective said shank portions in a second plane spaced from and parallel to said first plane and its respective said action ends defining a second row of tine ends spaced from and parallel to said first row of tine ends, and a third set of said tines having its respective said shank portions in a third plane spaced from and parallel to said first plane and said second plane and its respective said action ends defining a third row of tine ends spaced from and parallel to said first row and said second row of tine ends;

(g) said spring coils of said respective first set of tines being aligned about a first axis and said spring coils of said respective second set of tines being aligned about a second axis radially spaced from said first axis.

56. The lawn rake of claim 55, wherein said spring coils of said third set of tines are aligned about a third axis.

57. The lawn rake of claim 56, wherein said first axis, said second axis and said third axis are radially spaced from each other.

58. A raking device; comprising:

(a) rake head means serving as a support;

(b) an array of tine means carried by said rake head means;

(c) each of said tine means of said array of tine means including a shank portion having an end connected to said rake head means so as to extend outwardly therefrom and an action portion extending from and disposed at a predetermined angle with respect to its respective said shank portion;

(d) each said shank portion of said tine means of said array of tine means further including spring coil disposed at a location spaced from said shank portion end that is connected to said rake head means; and (e) said array of tine means including at least two sets of tine means, a first set of which having its respective said shank portions in a first plane and its respective said action ends defining a first row of tine ends, a second set of which having its respective said shank portions in a second plane and its respective said action ends defining a second row of tine ends.

59. The raking device of claim 58, wherein said spring coils are each integrally formed from the material of the respective said tine means.

60. The raking device of claim 59, wherein said first plane and said second plane are parallel and spaced one from the others and said first row and said second row are parallel and spaced one from the other.

61. The raking device of claim 60, wherein said spring coils of said respective first set of tine means are aligned about a first axis and said spring coils of said respective second set of tine means are aligned about a second axis.

62. The raking device of claim 61, wherein said first axis is radially spaced from said second axis.

63. The raking device of claim 62, wherein said tine means are formed from material which is resilient and springy.

64. The raking device of claim 61, wherein said spring coil of each of said tine means are fabricated so as to unwind at least a portion of the coil upon utilization of the device.

65. The raking device of claim 64, wherein said rake head means includes a support bar and said shank portions of said tine means each include a connecting end each secured to said support bar at right angle thereto.

66. A raking device; comprising:

(a) rake head means serving as a support;

(b) an array of tine means carried by said rake head means;

(c) each of said tine means of said array of tine means including a shank portion having an end connected to said rake head means so as to extend outwardly therefrom and an action portion extending from and disposed at a predetermined angle with respect to its respective said shank portion;

(d) each of said tine means of said array of tine means further including a spring coil formed and fabricated so as to unwind at least a portion of the coil upon utilization of the device; and (e) said array of tine means including at least two sets of tine means, a first set of which having its respective said shank portions in a first plane and its respective said action ends defining a first row of tine ends, a second set of which having its respective said shank portion in a second plane and its respective said action ends defining a second row of tine ends.

67. The raking device of claim 66, wherein said first plane and said second plane are parallel and spaced one from the others and said first row and said second row are parallel and spaced one from the other.

68. The raking device of claim 67, wherein said spring coils of said respective first set of tine means are aligned about a first axis and said spring coils of said respective second set of tine means are aligned about a second axis.

69. The raking device of claim 68, wherein said first axis is radially spaced from said second axis.

70. The raking device of claim 69, wherein said tine means are formed from material which is resilient and springy.

71. The lawn rake of claim 66, wherein each tine means is substantially "U" shaped in configuration and includes a pair of spaced legs each said leg having a shank portion, a spring coil and an action portion, said shank portions being connected by a connecting portion for connecting said tine means to said rake head means.

72. The lawn rake of claim 71, wherein threaded members connect each said tine means to said rake head means through said connecting portion.

73. The raking device of claim 66 including wheel means carried by said rake head means to facilitate movement of the raking device.

74. The raking device of claim 66, wherein said spring coils are each integrally formed from the material of the respective said tine means.

75. A raking device; comprising:

(a) rake head means serving as a support and including a support bar;

(b) an array of tine means carried by said rake head means;

(c) each of said tine means of said array of tine means including a shank portion having a connecting end secured to said support bar of said rake head means so as to extend outwardly therefrom at a right angle thereto and an action portion extending from and disposed at a predetermined angle with respect to its respective said shank portion;

(d) each of said tine means of said array of tine means further including a spring coil integrally formed from the material of the respective said tine means; and (e) said array of tine means including at least two sets of tine means, a first set of which having its respective said shank portions in a first plane and its respective said action ends defining a first row of tine ends, a second set of which having its respective said shank portion in a second plane and its respective said action ends defining a second row of tine ends.

76. A raking device; comprising:
(a) rake head means serving as a support and including a support bar;
(b) an array of tine means carried by said rake head means and formed from material which is resilient and springy;
(c) each of said tine means of said array of tine means including a shank portion having a connecting end secured to said support bar of said rake head means so as to extend outwardly therefrom and at a right angle thereto and an action portion extending from and disposed at a predetermined angle with respect to its respective said shank portion;
(d) each of said tine means of said array of tine means further including a spring coil integrally formed from the material of the respective said tine means and fabricated so as to unwind at least a portion of the coil upon utilization of the device; and
(e) said array of tine means including at least three sets of tine means, a first set of said tine means having its respective said shank portions in a first plane and its respective said action ends defining a first row of tine ends, a second set of said tine means having its respective said shank portions in a second plane spaced from and parallel to said first plane and its respective said action ends defining a second row of tine ends spaced from and parallel to said first row of tine ends and a third set of tine means having its respective said shank portions in a third plane parallel to and spaced from said first plane and said second plane and having its respective said action ends defining third row of tine ends parallel to and spaced from said first row of tine ends and said second row of tine ends;
(f) said spring coils of said respective first set of tine means being aligned about a first axis and said spring coils of said respective second set of tine means being aligned about a second axis radially spaced from said first axis.

77. The raking device of claim 76, wherein said tine means of said third set each includes a spring coil and said spring coils are aligned about a third axis.

78. The raking device of claim 77, wherein said first axis, said second axis and said third axis are radially spaced from each other.

* * * * *